UNITED STATES PATENT OFFICE.

GEORGE FRANÇOIS JAUBERT, OF PARIS, FRANCE.

COMPOUND CONTAINING ACTIVE OXYGEN AND PROCESS OF MAKING.

1,039,408.   Specification of Letters Patent.   Patented Sept. 24, 1912.

No Drawing.   Application filed October 13, 1904. Serial No. 228,317.

*To all whom it may concern:*

Be it known that I, GEORGE FRANÇOIS JAUBERT, have invented a new and useful Improvement in the Preparation of Salts and Acids Containing Easily-Liberated Active Oxygen, which improvement is fully set forth in the following specification.

It is known that when an acid is caused to react upon certain peroxids, particularly the alkaline peroxids of sodium, potassium, calcium, strontium, barium, etc., hydrogen peroxid is formed together with the salt of the acid employed. For example (R being bivalent)

$$RO_2 + H_2SO_4 = SO_4R + H_2O_2.$$

I have however found that when certain acids such as boric acid, sulfuric acid, acetic acid, etc., are caused to react upon these peroxids under controlled conditions new products of a saline nature are formed which contain active oxygen. These products, which can easily be isolated in a solid state, are not merely the hydrates of peroxids, for they are stable at a temperature at which the hydrates would have long been decomposed.

I now present the following detailed examples of carrying out my invention. 248 grams of crystallized boric acid are mixed with 78 grams of peroxid of sodium. The homogeneous powder thus obtained is then added little by little to two liters of cold water while constantly stirring at a temperature which may be below 20° C. but which is not restricted thereto. The powder is entirely dissolved, but after a short time the new substance commences to crystallize because it is only slightly soluble. The deposit is removed by filtration, washed with cold water, first dried in the air and then further dried in a heating chamber at a temperature of about 50° C. The substance thus obtained contains about 4% of active oxygen and appears to correspond to the formula $$Na_2B_4O_8 + 10H_2O.$$

It presents itself in the form of a crystalline powder, white as snow, and, upon dissolving the substance in water, without the addition of any acid a solution is obtained having all the properties of water charged with free and active oxygen. By inspection of the formula, it will be seen that it corresponds to ordinary borax $(Na_2B_4O_7)$ plus an extra atom of oxygen. Upon solution in water this added oxygen is gradually liberated with the formation of ordinary borax. The solution thus obtained has a freely alkaline reaction.

One may also mix 10 kgs. 935 gr. of concentrated sulfuric acid, free from arsenic and iron, with 170 liters of water and then add a mixture formed of 16 kgs. 250 gr. of peroxid of sodium and 16 kgs. 250 gr. of boric acid in powdered form. The temperature must not be allowed to exceed about 20° C. The solution is allowed to stand for some hours, and then the abundant deposit of the new substance is removed by filtration. It is then washed in cold water, pressed and dried in the air. In this way is obtained 29 kgs. 500 gr. of a product containing 10% of active oxygen and corresponding to the formula $$NaBO_3 + 4H_2O.$$

This new substance presents itself in white crystals extremely stable at the ordinary temperature and also at 50° to 60° C., and is not attacked by the carbonic acid of the air. From the formula, it is evident that this substance is the sodium salt of a perboric acid. By simple dissolution in cold water, and without the addition of any acid, this new substance gives, also, a solution having all the properties of water charged with free oxygen, and as the new substance may be preserved indefinitely in a dry state, it constitutes a convenient reagent for the preparation of peroxid of hydrogen.

Having thus fully described my invention, what I claim is:—

1. The process of making a new compound which consists in subjecting one of those peroxids which in the presence of a hydrogen-containing acid normally form hydrogen-peroxid and the salt of the acid, to the slow action of such an acid at a reduced temperature, and then isolating the solid peroxidized body so formed.

2. The process of making a new compound which consists in subjecting one of those peroxids which in the presence of a hydrogen-containing acid normally form hydrogen-peroxid and the salt of the acid, to the slow action of such an acid at a reduced temperature and in the presence of water, and then isolating the solid peroxidized body so formed.

3. The process of making a new compound, which consists in subjecting one of those peroxids which in the presence of an acid normally form hydrogen peroxid and the salt of the acid, to the slow action of an acid at a reduced temperature, then isolating the solid peroxidized body so formed, washing said peroxidized body and drying it.

4. The process of making a new compound which consists in slowly adding one of those peroxids which in the presence of an acid normally form hydrogen peroxid and the salt of the acid, and an acid, to cold water while stirring, then filtering it removing the solid peroxidized body and drying it first without artificial heat and then with artificial heat not exceeding 60 degrees C.

5. The process of making a new compound which consists in intimately mixing a dry peroxid with a solid acid, adding the mixture to water and isolating the new solid peroxidized compound formed.

6. The process of making a new compound which consists in mixing a dry peroxid with a solid acid, adding the mixture to water, allowing the solution to stand till crystallization takes place, and isolating the new solid peroxidized compound formed.

7. The new saline body containing a fixed base and consisting of a white crystalline powder containing active oxygen liberated readily by simple solution in water and corresponding to the formula $$Na_2B_4O_8+10H_2O.$$

8. The process of making a new compound which consists in intimately mixing a dry peroxid with a solid acid, adding the mixture to a solvent, and isolating the new solid peroxidized compound formed.

9. The process of making a new compound which consists in mixing a dry peroxid with a solid acid, adding the mixture to a solvent, allowing the solution to stand until crystallization takes place, and isolating the new solid peroxidized compound formed.

10. The herein described process of making sodium perborate, which consists in reacting upon boric acid in the presence of water, with sodium peroxid while maintaining the temperature below twenty degrees (20°) centigrade, and thereafter separating the sodium perborate from the solution and drying the same.

In testimony whereof I have signed this specification in the presence of two subscribing witnesses.

GEORGE FRANÇOIS JAUBERT.

Witnesses:
 JEAN VAUCHER,
 GEORGE E. LIGHT.